Feb. 5, 1929.  
E. J. TSCHANTZ  
1,700,866  
RADIAL AND END THRUST ROLLER BEARING  
Filed Feb. 4, 1927 2 Sheets-Sheet 1
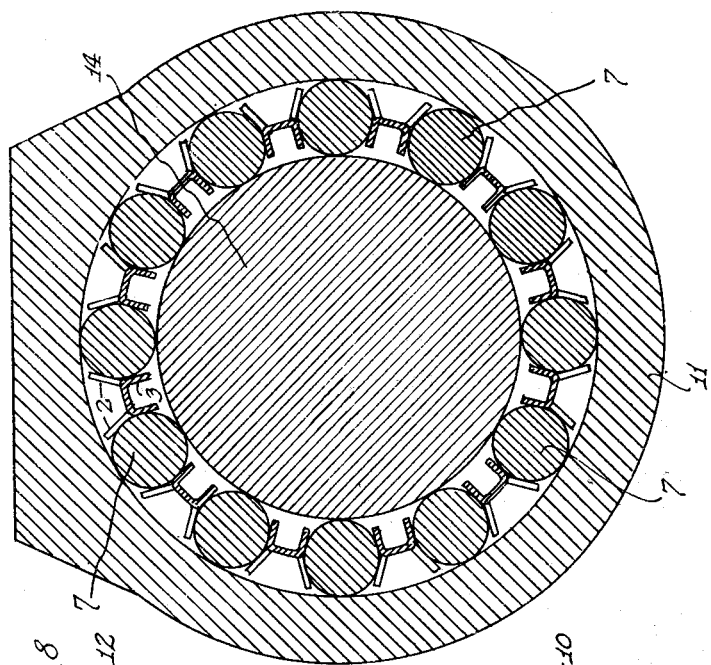
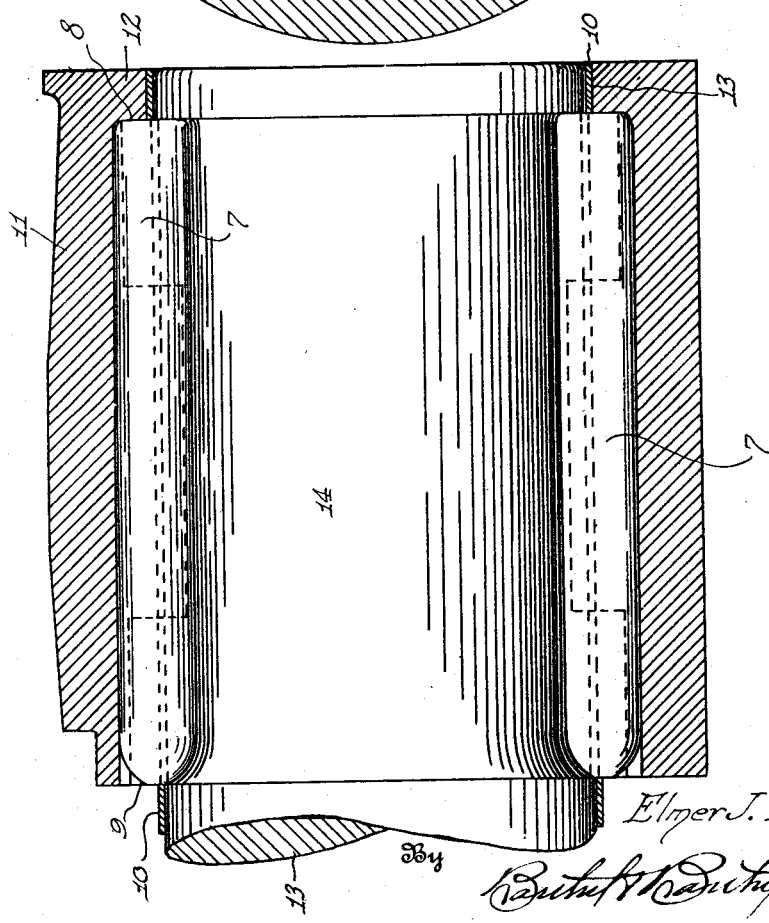
Inventor  
*Elmer J. Tschantz*  
By  
Attorneys

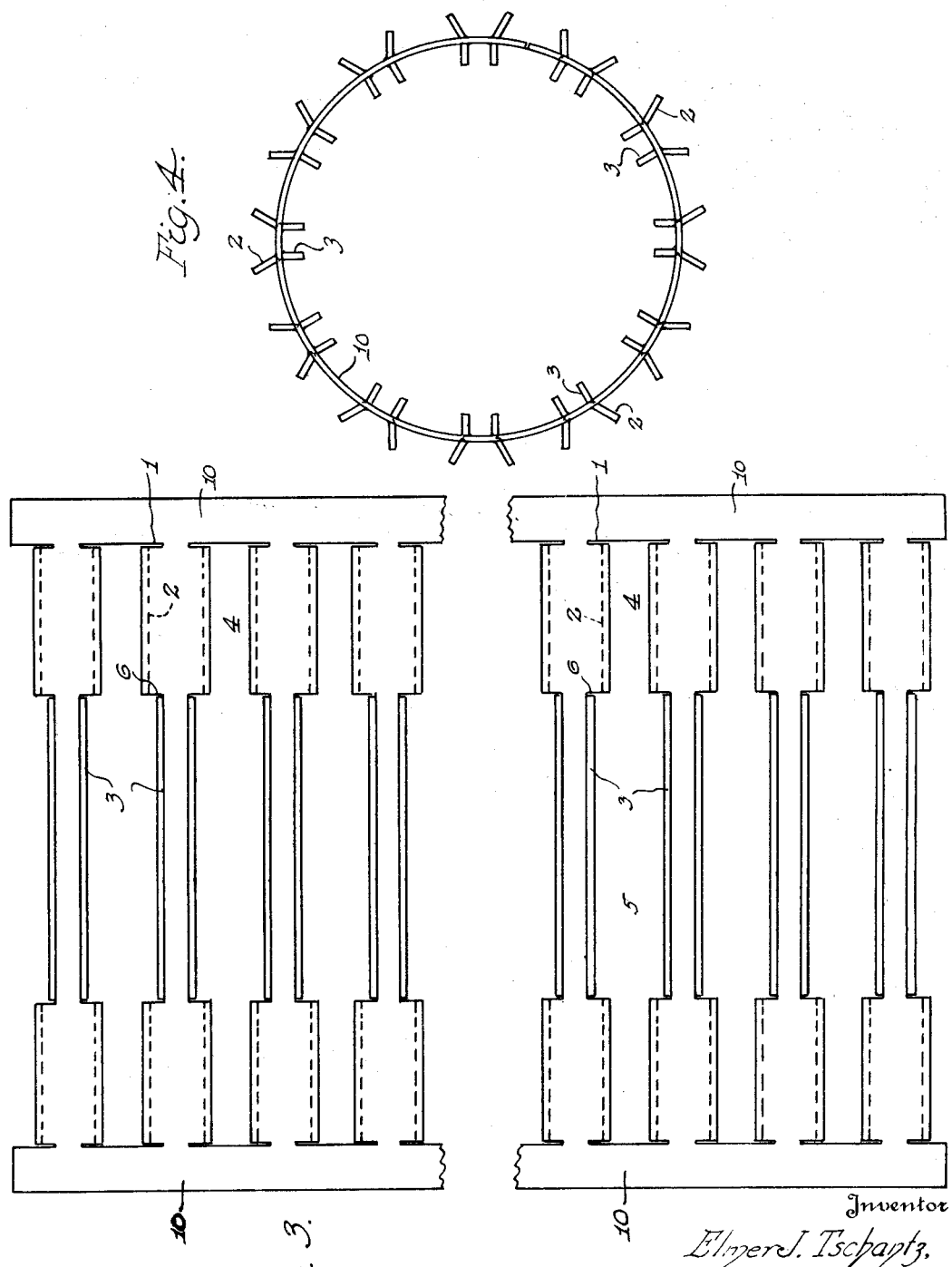

Patented Feb. 5, 1929.

1,700,866

UNITED STATES PATENT OFFICE.

ELMER J. TSCHANTZ, OF CANTON, OHIO.

RADIAL AND END THRUST ROLLER BEARING.

Application filed February 4, 1927. Serial No. 165,796.

My invention aims to provide radial and end thrust roller bearings that may be advantageously used in the journal, housings, or spindle enclosures of rolling stock and various kinds of machinery having bearings for the ends of an axle, shaft, spindle, or other rotary member. The purpose of my roller bearing is to provide ample support for a rotary member with the friction reduced to a minimum for such a support, and the supporting rollers are constructively arranged in the journal box or housing to serve as end thrust bearings. This makes my roller bearing particularly applicable to rolling stock or any structure subjected to side sway.

My invention also aims to provide a novel cage for roller bearings by which the rollers are maintained in spaced relation and carried so as to be conveniently handled. The cage involves a method of construction wherein a strip of metal or other suitable material is cut and stamped to form end connecting members, end flanges and intermediate flanges, the end flanges projecting from one face of the strip to form end retainers and the intermediate flanges projecting from the opposite face of the strip to form intermediate retainers. The strip is bent or otherwise fashioned to cylindrical form whereby the end and intermediate flanges may cooperate in forming roller retainers, while the connecting members assume a band or ring formation for holding the rollers against longitudinal displacement in the cage. This method of manufacturing the cage permits of the same being economically and expeditiously produced and obviously the retained rollers may be conveniently handled for installation.

My invention will be hereinafter specifically described and then claimed, and reference will now be had to the drawings, wherein Figure 1 is a longitudinal sectional view of a journal box provided with a radial and end thrust roller bearing in accordance with this invention;

Fig. 2 is a cross sectional view of the same;

Fig. 3 is a plan of a portion of a strip cut and stamped for the formation of a cage, and Fig. 4 is an end view of the cage.

Obviously roller cages of various dimensions will be made and a strip of flat relatively thin metal or other material is selected and of such length that it will when placed in cylindrical form provide a cage of desired diameter and length. The metallic strip will have parallel side edges and adjacent each side edge are equally spaced longitudinally disposed slits 1. The material between the slits at one side of the strip and the slits at the opposite side of the strip is slitted and bent outwardly, on opposite sides of the strip to form sets of parallel end flanges 2 and sets of intermediate flanges 3. In forming the flanges 2 and 3 it becomes necessary to slit or cut away material, as at 4, adjacent each of the slits 1 to form the flanges 2 which are of equal length. To form the flanges 3, which are of greater length than the end flanges 2, it becomes necessary to make a longer slit or cut away more material, as at 5, and in addition there are short slits 6 disposed longitudinally of the strip and parallel to the slits 1, so that the flanges 3 will be of greater depth than the flanges 2 and spaced differently from the end flanges 2. The slitted or cut away portions of the strip provide transverse slots or openings and it is these slots that eventually accommodate the rollers of the bearing. As shown in Fig. 3 the intermediate flanges 3 are bent inward from one face of the strip and the end flanges 2 are bent outwardly from the opposite face of the strip, but the end flanges 2 are but partially bent in Fig. 3. This has been illustrated in this manner in order to more clearly bring out the slits 1 and the fact that the end flanges 2 are in sets separated from the intermediate flanges 3. The flanges 2 and 3 are adapted to cooperate in forming roller retainers and this is brought about by bending the strip to cylindrical form, as shown in Fig. 4. Obviously the ends of the strip may be connected if desired to maintain the cylindrical form and it will be noted that the intermediate flanges 3 project inwardly and the end flanges 2 outwardly.

Prior to placing the strip in cylindrical form and prior to definitely setting the angularity of either the flanges 2 or the flanges 3, rollers 7 are placed in the slots from which the flanges 2 and 3 are removed. These rollers correspond in length to the transverse slots of the strip and are retained in the slots by the flanges 2 and 3 embracing side portions of the rollers, as best shown in Fig. 2. The rollers 7 have flat ends 8 and conical ends 9 and these ends are engaged by the annular connecting members 10 of the strip, said connecting members holding the flange formations in spaced relation to the cage and by reference to Fig. 1 it will be noted that said connecting members serve as end abutments to prevent longitudinal displacement of the rollers in the cage.

The roller bearing has been especially designed for the journal box 11 having an annular flange or end wall 12. Ordinarily an axle 13, adapted to be journaled in the box 11, has a neck or spindle portion 14, and it is this portion of the axle which is supported by the rollers 7. The flat ends 8 of the rollers abut the flange or end wall 12 and the connecting member 10 at one end of the cage extends into the opening 13 formed by the annular flange 12. This constructive arrangement of parts permits the rollers 7 to serve as end thrust bearings when considering the flange 12 as being at the outer end of the journal box. Any side thrust of the axle 13 towards the outer end of the journal box is resisted by the rollers 7 bearing against the end flange 12, and such resistance does not materially interfere with the radial bearing function of the circumferentially arranged rollers.

The roller cage may be used as a substitute for liners, bushings or the like or may be comparatively associated with such elements, all of which depends on the machine, apparatus or structure in which my improved bearing is used.

I attach considerable importance to the roller cage, particularly the method of producing the same by first slotting and slitting a flat blank, and then bending the blank to cylindrical form so that pressed out flanges will be grouped about the rollers to retain the same in engagement with the cage and thus facilitate installing the same on a rotary member in a journal box or other structure.

While in the drawing there is illustrated a preferred embodiment of my invention it is to be understood that the structural elements are susceptible to such changes as are permissible by the appended claim.

What I claim is:—

A cage for rollers, comprising a strip of metal cut and stamped to provide end and intermediate flanges projecting from opposite faces of said strip of metal, said strip of metal being bent to cylindrical form so that the flanges thereof may cooperate in providing roller retainers, the formation of said flanges leaving bands at the ends of said cage adapted to prevent longitudinal displacement of the rollers.

In testimony whereof I affix my signature.

ELMER J. TSCHANTZ.